(12) United States Patent
Toft et al.

(10) Patent No.: US 12,550,085 B2
(45) Date of Patent: Feb. 10, 2026

(54) TIMING ADVANCE LOOPS

(71) Applicant: Nokia Technologies Oy, Espoo (FI)

(72) Inventors: Morten Toft, Svenstrup (DK); Samantha Caporal Del Barrio, Aalborg (DK); Christian Rom, Aalborg (DK); Simon Svendsen, Aalborg (DK); Sami-Jukka Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 243 days.

(21) Appl. No.: 18/374,087

(22) Filed: Sep. 28, 2023

(65) Prior Publication Data

US 2024/0121732 A1    Apr. 11, 2024

(30) Foreign Application Priority Data

Sep. 29, 2022    (EP) .................................... 22198672

(51) Int. Cl.
*H04W 56/00* (2009.01)
(52) U.S. Cl.
CPC ................. *H04W 56/001* (2013.01)
(58) Field of Classification Search
CPC ......... H04W 56/001; H04W 56/0045
See application file for complete search history.

(56) References Cited

U.S. PATENT DOCUMENTS

2018/0352461 A1    12/2018 Guirguis et al.
2019/0132778 A1    5/2019  Park et al.
(Continued)

FOREIGN PATENT DOCUMENTS

| WO | WO 2021/086004 A1 | 5/2021 |
|---|---|---|
| WO | WO 2022/082455 A1 | 4/2022 |
| WO | WO 2022/130207 A1 | 6/2022 |

OTHER PUBLICATIONS

EESR (22198672) Mar. 13, 2023, 10 pgs.
(Continued)

*Primary Examiner* — Kyaw Z Soe
(74) *Attorney, Agent, or Firm* — Lippes Mathias LLP

(57) ABSTRACT

Example embodiments may relate to an apparatus, method and/or computer program for managing timing advance loops. The method may comprise receiving, at a user equipment from a plurality of network nodes, respective downlink reference signals, wherein an antenna system of the user equipment receives the downlink reference signals using a wide beam configuration. The method may also comprise performing measurements on the received downlink reference signals to determine a parameter and for determining that the parameter does not meet a predetermined criteria. Based on the parameter not meeting the predetermined criteria, the method may comprise configuring the antenna system such that at least one of the downlink reference signals is received using a narrow beam configuration. The method may involve re-performing the measurements on downlink reference signals from the plurality of network nodes. Based on the parameter meeting the predetermined criteria, it may be determined that transmission of candidate uplink signals, from the user equipment to the at least one of the plurality of network nodes, can be grouped into one timing advance loop.

19 Claims, 7 Drawing Sheets

(56) References Cited

U.S. PATENT DOCUMENTS

| | | |
|---|---|---|
| 2021/0185670 A1 | 6/2021 | Taherzadeh Boroujeni et al. |
| 2021/0258895 A1* | 8/2021 | Sakhnini ................. H04W 8/22 |
| 2021/0321355 A1 | 10/2021 | Gao et al. |
| 2022/0085943 A1 | 3/2022 | Zhu et al. |
| 2022/0174509 A1* | 6/2022 | Noh .................... H04W 56/001 |

OTHER PUBLICATIONS

Huawei et al. "Considerations on timing advance design in Nr", R1-1719810 3GPP TSG RAN WG1 Meeting #91, Nov. 27-Dec. 1, 2017, xp051369188, Nov. 17, 2017, 4 pgs.

Khoshnevisan et al. "Enhanced Reliability and Capacity with Multi-TRP Transmission", IEEE Communications Standards, V. 6, N. 1, Mar. 1, 2022, DOI: 10.1109/MCOMSTD.0001.2100059 pp. 13-19.

\* cited by examiner

TIMING ADVANCE LOOPS

FIELD

Example embodiments may relate to an apparatus, method and/or computer program for managing timing advance (TA) loops.

BACKGROUND

Communication systems enable communication between two or more nodes or devices, such as fixed or mobile communication devices. Signals can be carried on wireless carriers.

An example of a cellular communication system is an architecture that is being standardized by the 3rd Generation Partnership Project (3GPP). There has been development in this field often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, network nodes or access points, which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

A network node may transmit timing advance (TA) commands to client devices, for example, a user device in order to align uplink (UL) transmissions to downlink (DL) transmissions timing at the network node. The TA is used to compensate for the propagation delay between the client device and the network node. The TA allows an UL subframe to be aligned with a DL subframe in the network node even when some client devices experience different propagation delays.

In a multi-TRP scenario, a client device is able to connect to multiple network nodes, which may be termed transmission reception points (TRPs).

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising: means for receiving, at a user equipment from a plurality of network nodes, respective downlink reference signals, wherein an antenna system of the user equipment receives the downlink reference signals using a wide beam configuration; means for performing measurements on the received downlink reference signals to determine a parameter and determining that the parameter does not meet a predetermined criteria; means for reconfiguring, based on the parameter not meeting the predetermined criteria, the antenna system such that at least one of the downlink reference signals is received using a narrow beam configuration; means for re-performing the measurements on downlink reference signals from the plurality of network nodes to determine the parameter and determining that the parameter does meet the predetermined criteria; and means for determining, based on the parameter meeting the predetermined criteria, that transmission of candidate uplink signals, from the user equipment to at least one of the plurality of network nodes, can be grouped into one timing advance loop.

The apparatus may further comprise means for transmitting, to at least one of the plurality of network nodes, an indication that the transmission of the candidate uplink signals can be grouped into one timing advance loop.

The apparatus may further comprise means for receiving an activation signal for activation at the apparatus of the timing advance loop in response to transmitting the indication that the transmission of the candidate uplink signals can be grouped into one timing advance loop.

The apparatus may further comprise means for determining, based on the parameter not meeting the predetermined criteria, that a plurality of timing advance loops are required for transmission of the candidate uplink signals from the user equipment to the plurality of network nodes.

The apparatus may further comprise means for transmitting, to the plurality of network nodes, an indication that a plurality of timing advance loops are required for transmission of the candidate uplink signals.

The apparatus may further comprise means for receiving an activation signal, at the apparatus, for activation of the plurality of timing advance loops, in response to transmitting the indication that a plurality of timing advance loops are required for transmission of the candidate uplink signals from the user equipment.

The parameter may be indicative of a time delay, dT, between reception of a first and at least a second downlink reference signal from a first and at least a second network node of the plurality of network nodes respectively.

The means for determining that the parameter does not meet the predetermined criteria may be configured to determine that the parameter is above a threshold value; and the means for determining that the parameter does meet the predetermined criteria may be configured to determine that the parameter is at or below the threshold value.

The parameter may be determined according to:

$$dT+DS;\text{ and}$$

the threshold value may be determined according to:

$$\tfrac{2}{3}CP;$$

where DS may be indicative of a delay spread of the last received downlink reference signal of the downlink reference signals and CP may be indicative of a cyclic prefix of the received downlink reference signals.

The means for reconfiguring the antenna system may be configured such that a plurality of the downlink reference signals are received using a narrow beam configuration.

The means for reconfiguring the antenna system may be configured such that all of the downlink reference signals are received using a narrow beam configuration.

The antenna system may comprise an antenna array comprising a plurality of antenna elements.

The apparatus may be a user device.

The network nodes may be radio access network, RAN, base stations.

The apparatus may comprise at least one processor; and at least one memory storing instructions that, when executed by the at least processor, cause the performance of the apparatus.

According to a second aspect, there is described a method comprising: receiving, at a user equipment from a plurality of network nodes, respective downlink reference signals, wherein an antenna system of the user equipment receives the downlink reference signals using a wide beam configuration; performing measurements on the received downlink reference signals to determine a parameter and determining that the parameter does not meet a predetermined criteria; reconfiguring, based on the parameter not meeting the predetermined criteria, the antenna system such that at least one of the downlink reference signals is received using a narrow beam configuration; re-performing the measurements on downlink reference signals from the plurality of network nodes to determine the parameter and determining that the parameter does meet the predetermined criteria; and determining, based on the parameter meeting the predetermined criteria, that transmission of candidate uplink signals, from the user equipment to at least one of the plurality of network nodes, can be grouped into one timing advance loop.

The method may further comprise transmitting, to at least one of the plurality of network nodes, an indication that the transmission of the candidate uplink signals can be grouped into one timing advance loop.

The method may further comprise receiving an activation signal for activation at the apparatus of the timing advance loop in response to transmitting the indication that the transmission of the candidate uplink signals can be grouped into one timing advance loop.

The method may further comprise determining, based on the parameter not meeting the predetermined criteria, that a plurality of timing advance loops are required for transmission of the candidate uplink signals from the user equipment to the plurality of network nodes.

The method may further comprise transmitting, to the plurality of network nodes, an indication that a plurality of timing advance loops are required for transmission of the candidate uplink signals.

The method may further comprise receiving an activation signal, at the apparatus, for activation of the plurality of timing advance loops, in response to transmitting the indication that a plurality of timing advance loops are required for transmission of the candidate uplink signals from the user equipment.

The parameter may be indicative of a time delay, dT, between reception of a first and at least a second downlink reference signal from a first and at least a second network node of the plurality of network nodes respectively.

The determining that the parameter does not meet the predetermined criteria may comprise determining that the parameter is above a threshold value; and determining that the parameter does meet the predetermined criteria may comprise determining that the parameter is at or below the threshold value.

The parameter may be determined according to:

$dT+DS$; and the threshold value may be determined according to:

$\frac{2}{3}Cp$;

where DS may be indicative of a delay spread of the last received downlink reference signal of the downlink reference signals and CP may be indicative of a cyclic prefix of the received downlink reference signals.

The reconfiguring the antenna system comprises receiving a plurality of the downlink reference signals using a narrow beam configuration.

The reconfiguring the antenna system comprises receiving all of the downlink reference signals using a narrow beam configuration.

The antenna system may comprise an antenna array comprising a plurality of antenna elements.

The network nodes may be radio access network, RAN, base stations.

According to a third aspect, this specification describes a computer program comprising instructions for causing an apparatus to perform at least the following: receiving, at a user equipment from a plurality of network nodes, respective downlink reference signals, wherein an antenna system of the user equipment receives the downlink reference signals using a wide beam configuration; performing measurements on the received downlink reference signals to determine a parameter and determining that the parameter does not meet a predetermined criteria; reconfiguring, based on the parameter not meeting the predetermined criteria, the antenna system such that at least one of the downlink reference signals is received using a narrow beam configuration; re-performing the measurements on downlink reference signals from the plurality of network nodes to determine the parameter and determining that the parameter does meet the predetermined criteria; and determining, based on the parameter meeting the predetermined criteria, that transmission of candidate uplink signals, from the user equipment to at least one of the plurality of network nodes, can be grouped into one timing advance loop.

According to a fourth aspect, this specification describes a computer-readable medium (such as a non-transitory computer-readable medium) comprising program instructions stored thereon for performing at least the following: receiving, at a user equipment from a plurality of network nodes, respective downlink reference signals, wherein an antenna system of the user equipment receives the downlink reference signals using a wide beam configuration; performing measurements on the received downlink reference signals to determine a parameter and determining that the parameter does not meet a predetermined criteria; reconfiguring, based on the parameter not meeting the predetermined criteria, the antenna system such that at least one of the downlink reference signals is received using a narrow beam configuration; re-performing the measurements on downlink reference signals from the plurality of network nodes to determine the parameter and determining that the parameter does meet the predetermined criteria; and determining, based on the parameter meeting the predetermined criteria, that transmission of candidate uplink signals, from the user equipment to at least one of the plurality of network nodes, can be grouped into one timing advance loop.

According to a fifth aspect, this specification describes an apparatus comprising: at least one processor; and at least one memory storing instructions that, when executed by the at least one processor, causes the apparatus to: receive, at a user equipment from a plurality of network nodes, respective downlink reference signals, wherein an antenna system of the user equipment receives the downlink reference signals using a wide beam configuration; perform measurements on the received downlink reference signals to determine a parameter and determine that the parameter does not meet a predetermined criteria; reconfigure, based on the parameter not meeting the predetermined criteria, the antenna system such that at least one of the downlink reference signals is received using a narrow beam configuration; re-perform the measurements on downlink reference signals from the plurality of network nodes to determine the parameter and determine that the parameter does meet the predetermined criteria; and determine, based on the parameter meeting the predetermined criteria, that transmission of candidate uplink signals, from the user equipment to at least one of the plurality of network nodes, can be grouped into one timing advance loop.

BRIEF DESCRIPTION OF THE DRAWINGS

Example embodiments will now be described by way of non-limiting example, with reference to the accompanying drawings, in which.

DETAILED DESCRIPTION

Example embodiments may relate to an apparatus, method and/or computer program for managing timing advance (TA) loops.

In a case where a client device, such as a user equipment (UE) has one active timing advance (TA) loop, the UE may indicate to a network over which it will communicate wireless signals, for example to a network node of the network, whether an additional TA loop is required for a reported downlink reference signal (DL RS) if the network activates another uplink transmission beam corresponding to the reported DL RS.

Example embodiments relate to an apparatus, method and/or computer program in which a UE may group network nodes, which may be referred to herein as transmission reception points (TRPs) into one TA-loop which previously may not have fulfilled a grouping criteria during neighbour cell measurements. This may expand the mTRP configurations that the UE can support.

Figure 1:
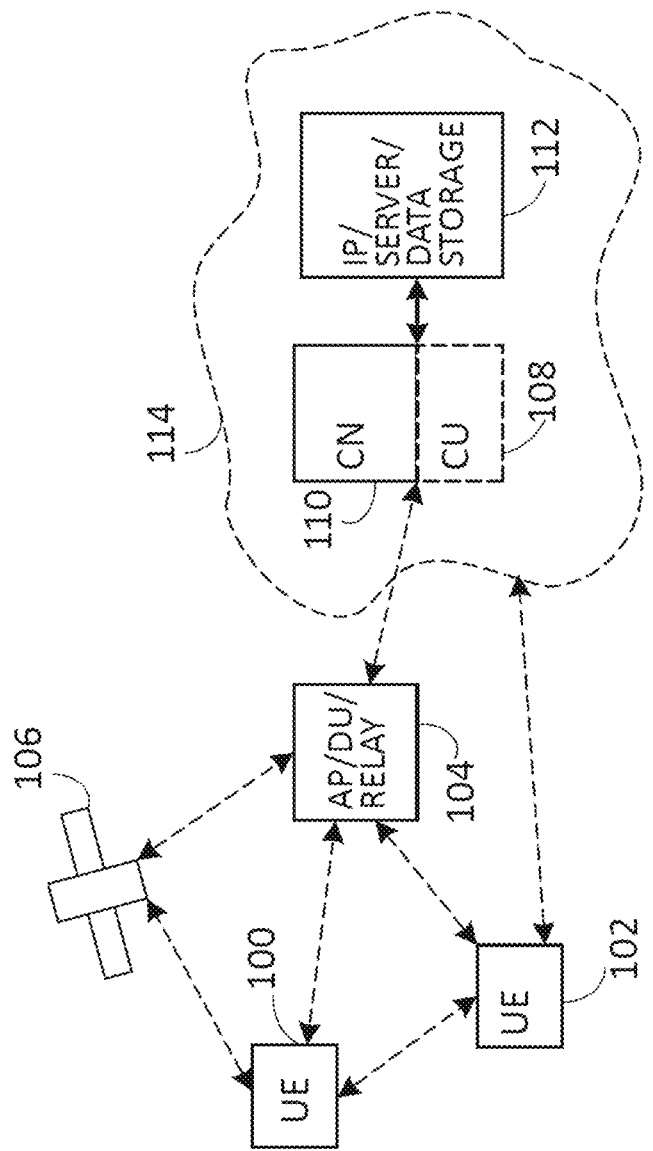
FIG. 1 shows, by way of example, a network architecture of a communication system.

FIG. 1 shows, by way of an example, a network architecture of a communication system which is a radio access network (RAN). In the following, different exemplifying embodiments will be described using, as an example of an access architecture to which embodiments may be applied, a radio access architecture based on long term evolution advanced (LTE Advanced, LTE-A) or new radio (NR), also known as fifth generation (5G), without restricting the embodiments to such an architecture, however. Embodiments may also be applied to other kinds of communications networks having suitable means by adjusting parameters and procedures appropriately. Some examples of other options for suitable systems are the universal mobile telecommunications system=radio access network, long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 shows first and second user devices 100, 102 configured to be in a wireless connection on one or more communication channels in a cell with a network node, such as a gNB 104 providing a cell. The physical link from a user device, e.g. the first user device 100, to the network node 104 is called the uplink (UL) or reverse link and the physical link from the network node to the user device is called the downlink (DL) or forward link. It should be appreciated that network nodes and their functionalities may be implemented by using any node, host, server or access point entity suitable for such a usage. A communications system typically comprises more than one network node in which case the network nodes may also be configured to communicate with one another over links, wired or wireless, designed for the purpose. These links may be used for signaling purposes. A network node is a computing device configured to control the radio resources of the communication system it is coupled to. A network node may also be referred to as a TRP, base station (BS), an access point or any other type of interfacing device including a relay station capable of operating in a wireless environment. A network node may include or is coupled to transceivers. From the transceivers of the network node 104, a connection may be provided to an antenna unit that establishes bi-directional radio links to user devices, such as the first and second user devices 100, 102. The antenna unit may comprise a plurality of antennas or antenna elements, for example arranged as an antenna array. The network node 104 may further be connected to a core network 110.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant, handset, device using a wireless modem (alarm or measurement device, etc.), laptop and/or touch screen computer, tablet, game console, notebook, a vehicle, fixed wireless access (FWA) and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

5G enables using multiple input and multiple output technology at both the UE and gNB side, many more base stations or nodes than the LTE. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

An edge cloud may be brought into radio access networks (RANs). Using an edge cloud may mean access node operations to be carried out, at least partly, in a server, host or node operationally coupled to a remote radio head or base station comprising radio parts. It is also possible that node operations will be distributed among a plurality of servers, nodes or hosts.

Applications of cloud RAN architecture enables RAN real time functions being carried out at the RAN side (in a distributed unit, DU 104) and non-real time functions being carried out in a centralized manner (in a centralized unit, CU 108).

In a multi-TRP scenario, a UE is able to connect to multiple transmission reception points (TRPs). Beam management is applied during a random access channel (RACH) procedure, when the UE forms the initial connection with the network, and while the UE is in a connected state. In a connected state, transmitting beams and receiving beams may be refined.

Beam management may define a set of functionalities to assist the UE to set its reception (Rx) and transmission (Tx) beams for DL receptions and UL transmissions, respectively. The functionalities can be categorized roughly according to four groups.

In beam indication, the UE is assisted to set its Rx and Tx beam properly for the reception of the DL and the transmission of the UL, respectively.

Beam acquisition, measurements and reporting refer to procedures for providing the gNB knowledge about feasible DL and UL beams for the UE.

Beam recovery refers to rapid link reconfiguration against sudden blockages, e.g. fast re-alignment of gNB and UE beams.

Beam tracking and refinement refer to procedures for measuring and aligning gNB and UE side beams, as well as to refine gNB and UE side beams.

Regarding DL beam management and especially for beam acquisition, measurements and reporting, different beam management procedures, referred to as P-1, P-2 and P-3, are supported within one or multiple TRPs of the serving cell.

P-1 may be used to enable UE measurement on different TRP Tx beams to support selection of TRP Tx beams/UE Rx beam(s). For beamforming at a TRP, it typically includes an intra/inter-TRP Tx beam sweep from a set of different beams. For beamforming at a UE, it typically includes a UE Rx beam sweep from a set of different beams.

P-2 is used to enable UE measurement on different TRP Tx beams to possibly change inter/intra-TRP Tx beam(s). Measurements may be performed from a possibly smaller set of beams for beam refinement than in P-1. P-2 may be a special case of P-1.

P-3 is used to enable UE measurement on the same TRP Tx beam to change a UE Rx beam in the case UE uses beamforming.

Regarding DL beam indication, a quasi-colocation (QCL) indication functionality has been defined. The UE may be configured with, or the UE implicitly determines, a source reference signal (RS) that the UE has received and measured earlier and which defines how to set the Rx beam for the reception of the DL physical signal or channel to be received. To provide the UE with QCL characteristics for the target signal, that is the signal to be received, a transmission coordination indication (TCI) framework has been defined. By using the TCI framework, the UE may be configured with TCI state(s) to provide the UE with source RS(s) for determining QCL characteristics. Each TCI state includes one or two source RSs that provide UE QCL TypeA, TypeB, TypeC and/or TypeD parameters. Different types provide the parameters as follows:

QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {Spatial Rx parameter}

In the UL, the UE is provided a parameter called spatial relation information, providing a spatial source RS based on which the UE determines the UL transmit beam. The spatial source RS can be DL RS (synchronization signal block (SSB) or channel state information reference signal (CSI-RS)) or UL RS (such as sounding reference signal (SRS)). In case of DL RS as a spatial source RS, the UE sets its transmit beam to be the same or similar as was its receive beam to receive the spatial source RS. In the case of UL RS as a spatial source RS, the UE sets its transmit beam to be the same or similar as was its transmit beam to transmit the spatial source RS. The spatial source RS may also be the QCL-TypeD RS provided to the UE in a certain TCI state. For each physical UL control channel (PUCCH) and SRS resource, gNB may provide explicitly a spatial source or TCI state while for physical UL shared channel (PUSCH) indirect indication may be provided.

PUSCH may be scheduled using DL control information (DCI) format 0_0 and the spatial source may be the same as with a certain PUCCH resource.

PUSCH may be scheduled using DCI format 0_1 and the spatial source may be the same as an indicated SRS resource(s). For example, the spatial source may be one SRS resource indicated in a codebook based transmission scheme, or one or multiple SRS resources indicated in a non-codebook based transmission scheme.

Rel-16 introduced a default spatial relation for dedicated PUCCH/SRS (except SRS with usage='beamManagement' and SRS with usage='nonCodeBook' and configured with associated CSI-RS). If spatial relation is not configured in FR2, the UE may determine the spatial relation as follows:
  in the case when control resource set(s) (CORESET) are configured on the component carrier (CC), the spatial relation is the TCI state/QCL assumption of the CORESET with the lowest index or identity (ID); or
  in the case when any CORESETs are not configured on the CC, the spatial relation may be the activated TCI state with the lowest index or ID applicable to PDSCH in the active DL bandwidth part (DL-BWP) of the CC.

CORESET defines time and frequency resources on which the physical DL control channel (PDCCH) candidates may be transmitted to the UE.

Furthermore, Rel-16 introduced a default spatial relation for PUSCH scheduled by DCI format 0_0 where UE determines spatial relation as follows:
- when there is no PUCCH, resources configured on the active UL BWP CC: the default spatial relation is the TCI state/QCL assumption of the CORESET with the lowest ID. The default pathloss RS is the QCL-TypeD RS of the same TCI state/QCL assumption of the CORESET with the lowest ID;
- when there is no PUCCH resources configured on the active UL BWP CC in FR2 and in RRC-connected mode: the default spatial relation is the TCI state/QCL assumption of the CORESET with the lowest ID. The default pathloss RS is the QCL-TypeD RS of the same TCI state/QCL assumption of the CORESET with the lowest ID.

Rel-17 is introducing a unified TCI framework meaning that TCI states so far providing QCL assumptions for the reception of DL signals and channels would be used also to provide spatial sources for the transmission of UL signals and channels. Furthermore, the unified TCI framework defines the concept of an indicated TCI state. The indicated TCI state can be a joint DL and UL TCI state or separate DL and UL TCI states. The indicated TCI state provides QCL source (DL) and spatial source (UL) for the set of DL signals and channels and for the set of UL signals and channels, respectively. In Rel-17 there can be one indicated joint DL and UL or one indicated DL and one indicated UL TCI state for the UE. The unified TCI framework is expected to be extended in Rel-18 so that there can be then multiple indicated DL and UL TCI states.

Timing advance (TA) is a special command or notification from a network node, e.g. gNB, to a UE that enables the UE to control and adjust its UL transmission timing. This kind of UL adjustment may be applied to the physical UL shared channel (PUSCH), the physical UL control channel (PUCCH) and sounding reference signal (SRS). The network keeps measuring a time difference between PUSCH/PUCCH/SRS/RACH reception and the subframe time, and may send a TA command to the UE to change the PUSCH/PUCCH/SRS transmission to make it better aligned with the subframe timing at the network side. For example, if PUSCH/PUCCH/SRS arrives at the network too early, the network may send a TA command to instruct the UE to transmit the signal a little bit later. As another example, if PUSCH/PUCCH/SRS arrives at the network too late, the network may send a TA command to instruct the UE to transmit the signal a little bit earlier.

When a UE is communicating with a TRP, the propagation delay for the RF signal to travel the distance between the TRP and the UE, and vice versa, will delay the signal in both DL and UL directions. In order for the TRP to decode the signal from multiple UEs, with different distances to the TRP and hence different propagation delays, the timing advance procedure will request each UE to advance its UL signal transmission in order for it to be received synchronised at a defined time at the TRP (to have a single FFT timing for all the incoming signals from different UEs for each TRP) such that different UEs have a shared target synchronization point. Furthermore, the TA loop mechanism ensures that the UL signal received at the TRP will have no overlap with the subsequent DL transmission, which could cause inter symbol interference (ISI).

The different UEs connected to the same TRP may apply a dedicated TA value per UE, hence all signals will arrive at the TRP in synchronisation, and with minimum inter-symbol overlap. Nevertheless, the DL signals from the TRP arrive at the different UEs at different time instances, depending on the different propagation delays.

TA may be delivered to UE through a random access response (RAR) (case 1) or a medium access control (MAC) control element (CE) (case 2), for example.

In case 1, the UE may figure out the TA value from two different MAC layer commands depending on the situation. For the first UL message after physical RACH (PRACH), the UE may apply the TA value that it extracts from RAR (RACH Response). After the initial RACH process, the UE may apply the TA value that it extracts from TA MAC CE if it received it.

Thus, the UE may adjust the UL transmission based on RAR during the RACH procedure.

In case 2, the UE may adjust the UL transmission based on the TA MAC CE, once the initial attach is complete.

For example, the TA command field may be 6 bits, which means 64 steps in total ranging from −32 to 32 T, in real timing. Since $T_c$ is 0.509 ns, the range of the physical timing is −16.3 µs to 16.3 µs with 15 kHz subcarrier spacing.

A timing advance group (TAG) comprises one or more serving cells with the same UL TA and the same DL timing reference cell. This may mean that the TAG consists of one or more serving cells with the same UL TA and same DL reference timing. Each TAG comprises at least one serving cell with configured UL, and the mapping of each serving cell to a TAG is configured by radio resource control (RRC). The TAG field in the MAC CE refers to the identifier of the TAG (tag-Id) specified in a RRC message.

Both for inter-cell multi-TRP and inter-cell beam management, it becomes likely that the distance between the involved TRPs becomes larger. Then, in DL receptions, an assumption that all signals would be received within the length of a cyclic prefix (CP) becomes invalid which may result in a performance loss. Similarly, for the UL transmissions, performance degradation may be caused by using the same TA in the UL for transmission to all TRPs. For example, with FR2 numerology 3, that is 120 kHz subcarrier spacing, the CP duration is 0.57 µs while symbol duration is 8.33 µs. The wave travels 171 m during the CP. Depending on deployment cell sizes, it may be that the additional travelled distance results in extra path loss of only some dBs, which may be considered acceptable from the path loss perspective. However, signals received from different TRPs may still arrive with a large time difference, sometimes even larger than the CP, which is considered to degrade the performance.

It is required to determine whether one, i.e. a single, TA loop or multi-TA loops are suitable for use with mTRP scenarios. Example embodiments may address how to determine whether a single TA loop or multi-TA loops are suitable for a particular mTRP scenario. Example embodiments may also address how to maximize the number of TRPs the UE can support with single-loop TA.

Figure 2:
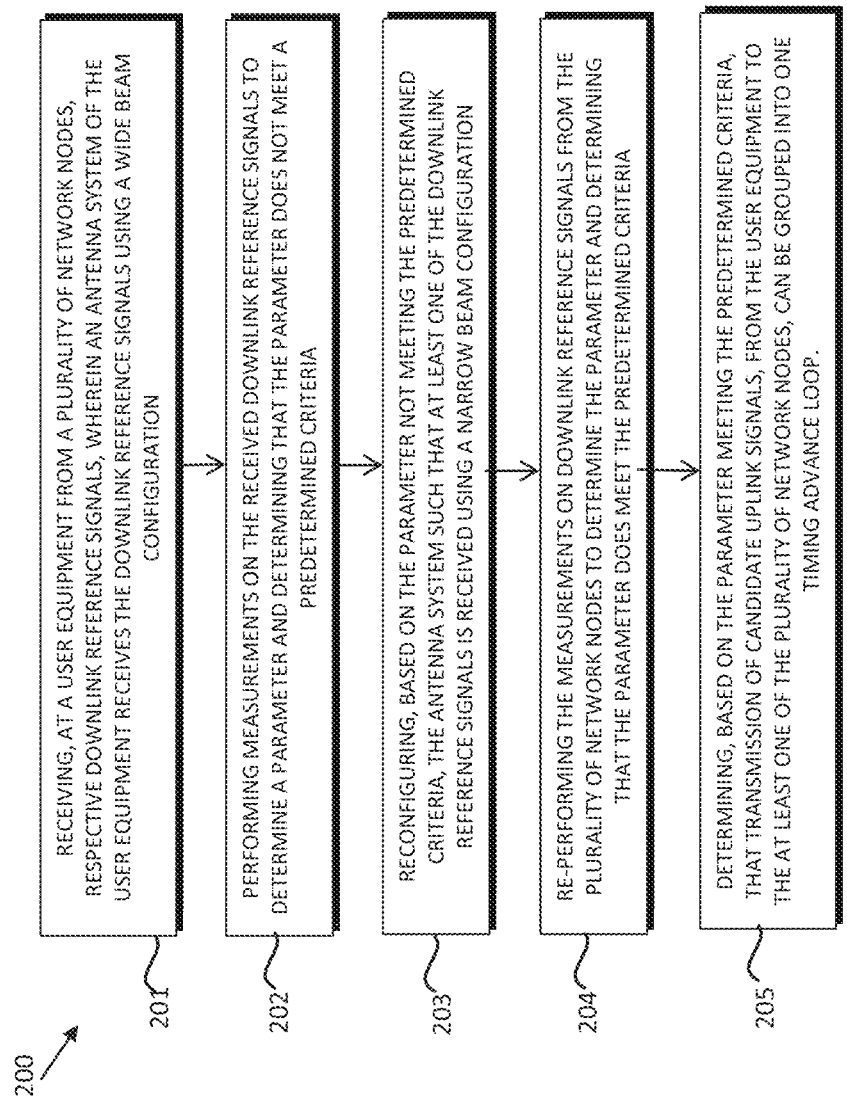
FIG. 2 shows, by way of example, a flowchart of a method.

FIG. 2 shows, by way of example, a flowchart of a method according to example embodiments. Each element of the flowchart may comprise one or more operations. The operations may be performed in hardware, software, firmware or a combination thereof. For example, the operations may be performed, individually or collectively, by a means, wherein the means may comprise at least one processor; and at least one memory storing instructions that, when executed by the at least one processor, cause the performance of the operations.

The method 200 may comprise a first operation 201 of receiving, at a UE from a plurality of network nodes, respective DL reference signals.

An antenna system of the UE may receive the DL reference signals using a wide beam configuration.

The method 200 may comprise a second operation 202 of performing measurements on the received DL reference signals to determine a parameter and determining that the parameter does not meet a predetermined criteria.

The method 200 may comprises a third operation 203 of reconfiguring, based on the parameter not meeting the predetermined criteria, the antenna system such that at least one of the DL reference signals is received using a narrow beam configuration.

The method 200 may comprise a fourth operation 204 of re-performing the measurements on DL reference signals from the plurality of network nodes to determine the parameter and determining that the parameter does meet the predetermined criteria.

The method 200 may further comprise a fifth operation 205 of determining based on the parameter meeting the predetermined criteria, that transmission of candidate UL signals, from the UE to the at least one of the plurality of network nodes, can be grouped into one timing advance loop.

In some embodiments, the method may further comprise transmitting, to at least one of the plurality of network nodes, an indication that the transmission of the candidate UL signals can be grouped into one timing advance loop. The method may further comprise receiving an activation signal for activation at the apparatus of the timing advance loop in response to transmitting the indication that the transmission of the candidate UL signals can be grouped into one timing advance loop.

In some embodiments, the method may alternatively comprise re-performing the measurements on DL reference signals from the plurality of network nodes to determine the parameter and determining that the parameter does not meet the predetermined criteria. The method may then comprise determining, based on the parameter not meeting the predetermined criteria, that a plurality of timing advance loops are required for transmission of the candidate UL signals from the user equipment to the plurality of network nodes. This may occur when it is determined that, despite the antenna configuration being reconfigured into the narrow beam configuration, the parameter still does not meet the predetermined criteria. The method may then comprise transmitting, to the plurality of network nodes, an indication that a plurality of timing advance loops are required for transmission of the candidate UL signals.

In some embodiments, the method may further comprise receiving an activation signal, at the apparatus, for activation of the plurality of timing advance loops, in response to transmitting the indication that a plurality of timing advance loops are required for transmission of the candidate UL signals from the user equipment.

In some embodiments, the method may comprise determining that the parameter is above or at or below a threshold value.

The method may be performed by an apparatus such as a UE 100 of FIG. 1, e.g. a mobile phone or a smart phone, or by a control device configured to control the functioning thereof, when installed therein. The UE 100 may be equipped with the antenna system. The antenna system may comprise an antenna array comprising a plurality of antenna elements or other known types of antenna. The antenna system may be configured to receive DL reference signals. Such antenna configurations can dynamically form and steer narrow transmission/reception beams, in a process known as UE-specific beamforming. Active antenna configurations can be used both at the network nodes and at the UE 100 to further enhance the beamforming potential. More than one beam can be received by each antenna array.

The antenna system may be configured to receive signals using the wide beam configuring. The same antenna system may be configured to receive signals using the narrow beam configuration. Alternatively, a different antenna system of the UE 100 can be configured to receive signals using the narrow beam configuration (i.e. a different antenna system is used for the wide and narrow beam configuration).

A wide beam configuration, otherwise known a broad beam configuration, allows a wide beam (broad beam) DL signal to be received by the UE 100. The wide beam configuration can be formed by configuring an antenna array in two alternative methods. The first method is to configure the antenna array to receive wide beam DL signals 302, for example by using only a single element of the antenna array to receive the DL signals. The second method is to configure the antenna array to use all the elements of the antenna array alongside a particular phase shift parameter between the elements. The second method of using an antenna array to receive the DL signals produces an increased rippling effect in the signals. A typical behaviour of the UE 100 is to measure neighbour TRPS with a wide beam 302 to maximize spherical coverage. In such cases, the UE 100 may measure a power delay profile (PDP) of one serving cell (TRP1) and one neighbour cell (TRP2) as represented in FIG. 3.

Figure 3:
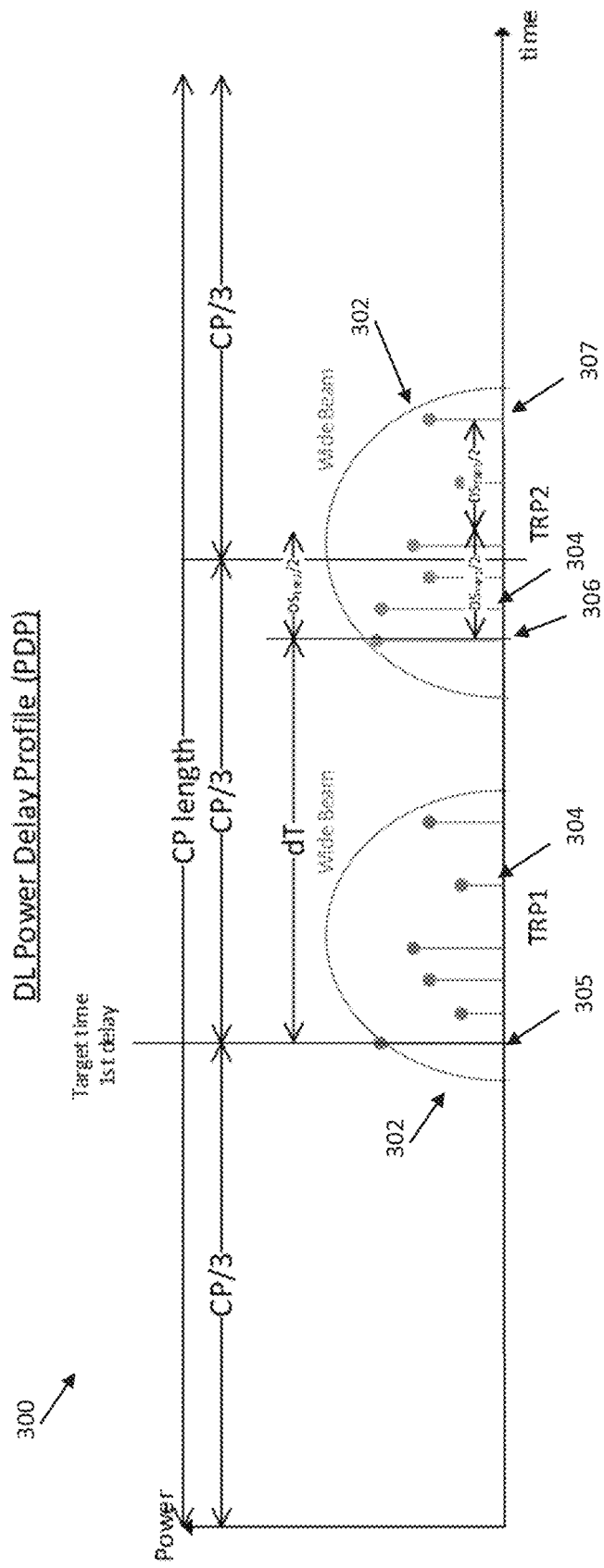
FIG. 3 shows, by way of example, a power delay profile measured by a UE receiving from two TRPs with wide beams.

As shown in FIG. 3, a wide beam, as received, may cover the full range of DL signals received at the UE 100 including all multipath components, generally indicated by reference numeral 304. Due to signal reflections, and different times of arrival, there is a spread of when the DL signals are received from each TRP, resulting in a spread of the multipath components 304 received at the UE 100. The wide beam 302 covers the full spread of multipath components 304 (i.e. the full signal) received at the UE 100 by the antenna system.

A narrow beam configuration (the term meaning narrow relative to the wide beam configuration) allows a narrow beam DL signal to be received by the UE 100. The wide beam configuration is capable of receiving multiple DL signals at once, whereas the narrow beam configuration is capable of receiving relatively less DL signals at once compared to the wide beam configuration. Where the antenna system is an antenna array, the narrow beam configuration can be generated by activating all elements of the array with phase shifters. In such a case, the UE 100 may measure the PDP of one serving cell (TRP1) and one neighbour cell (TRP2) as represented in FIGS. 4 and 5.

Figure 4:
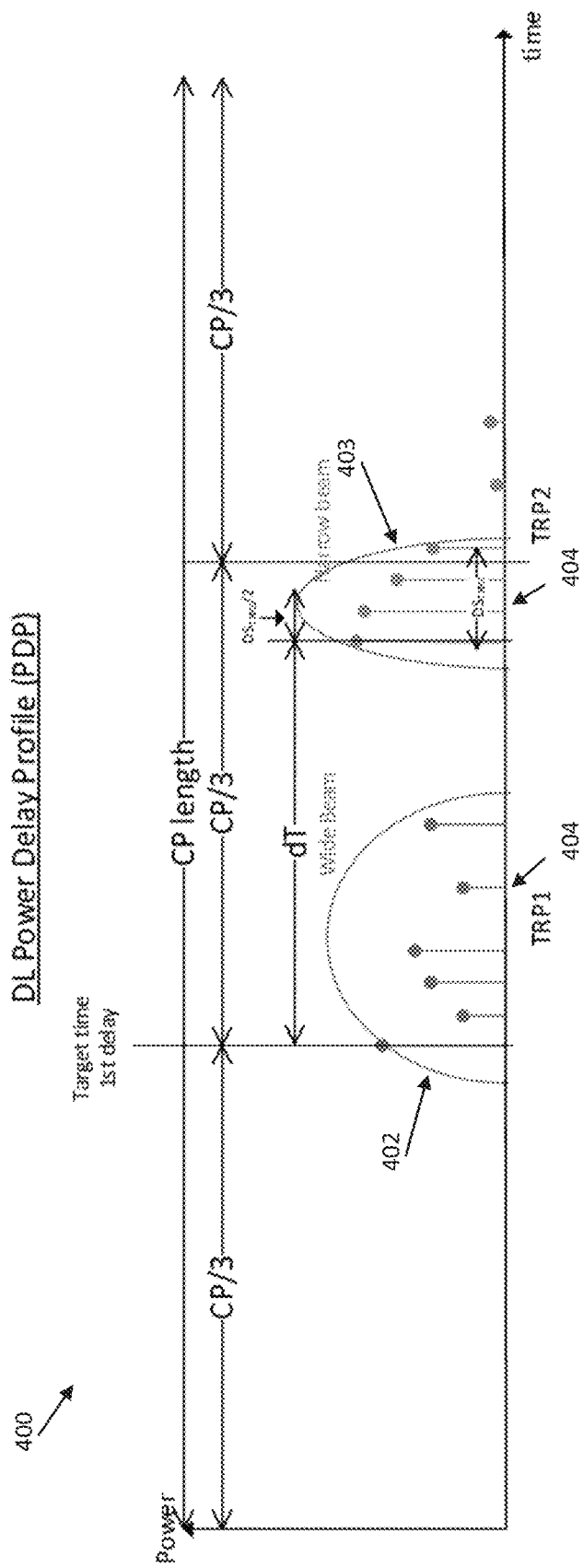
FIG. 4 shows, by way of example, a power delay profile measured by a UE receiving from two TRPs, the first TRP having a wide beam and the second TRP having a narrow beam.

FIG. 4 shows a wide beam signal 402 received from TRP1 and a narrow beam signal 403 received from TRP2.

Figure 5:
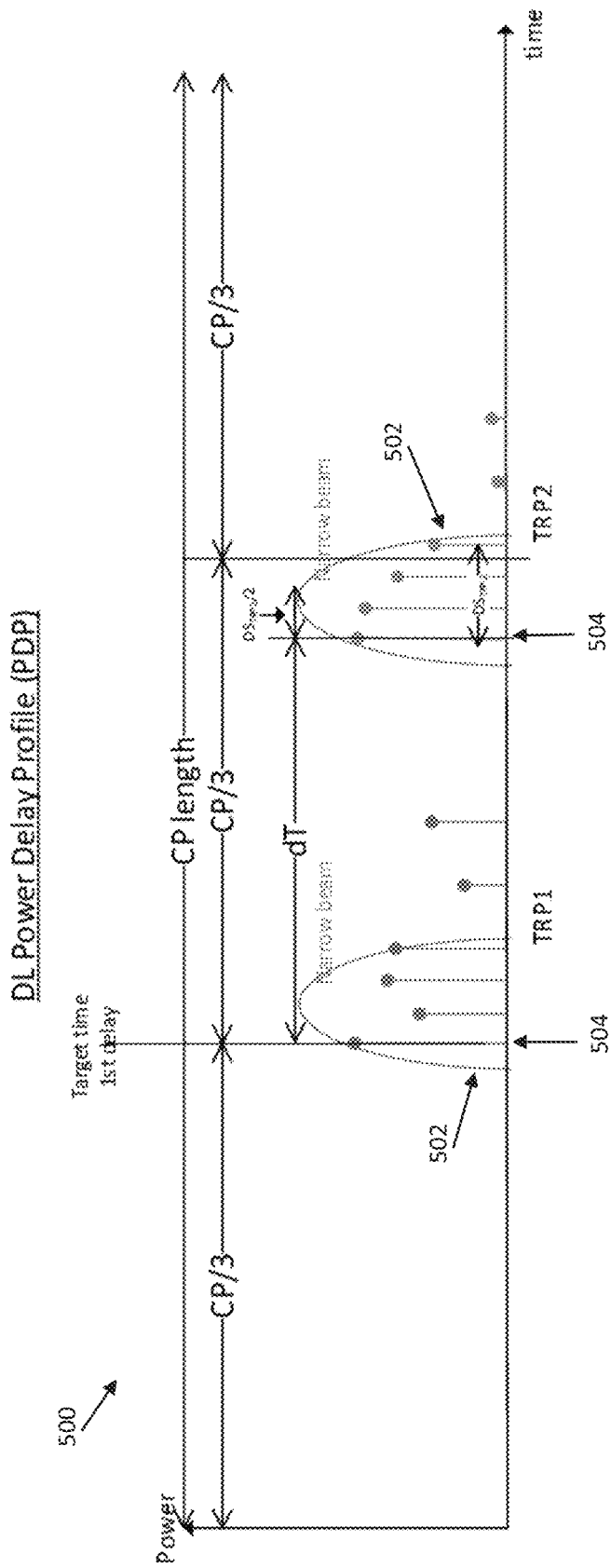
FIG. 5 shows, by way of example, a power delay profile measured by a UE receiving from two TRPs with narrow beams.

FIG. 5 shows the signals of TRP1 and TRP2 as narrow beam signals 502.

As noted from FIGS. 4 and 5, the received narrow beam signals 403, 502 cover only a proportion of the multipath components 404, 504 of the full signals, which are those received earliest by the antenna system of the UE 100. Multipath components 404, 505 which do not reach the antenna system of the UE 100 within a certain amount of time are not included in the received narrow beam signals 403, 502. The excluded multipath components 404, 505 are not considered part of the narrow beam.

As will be seen from FIG. 4, the received wide beam signal 402 has relatively wider time-domain coverage than the received narrow beam signal 403. This is exemplified by the differences in the width of the wide beam signal for TRP1 compared with the width of the narrow beam signal for TRP2. The term wide beam configuration is herein used to denote when the antenna system is configured to receive a wide beam signal. The term narrow beam configuration is herein used to denote when the antenna system is configured to receive a narrow beam signal.

The UE 100 may comprise means for receiving, from the plurality of network nodes, e.g. TRP1, TRP2 respective DL reference signals. The plurality of network nodes (e.g. TRP1 and TRP2) each transmit DL references signals and each of these signals are received by the UE 100. The antenna system of the UE 100 receives the DL reference signals with its antenna system configured to use either the wide or narrow beam configuration, as mentioned above.

The antenna system may be initially set up to receive the DL reference signals in a first mode using the wide beam configuration. Where the antenna system is an antenna array, the first mode may be achieved by using only a single element of the antenna array to receive the DL signals or by configuring the antenna array to use all elements of the antenna array alongside a particular phase shift parameter between the elements.

The UE 100 may comprise means for performing measurements on the received DL reference signals. The means for performing measurements may include hardware, software, firmware or a combination thereof. For example, the means may comprise at least one processor; and at least one memory storing instructions that, when executed by the at least one processor, cause the performance of the operations described above with reference to FIG. 2.

The operation of performing measurements may involve performing beam acquisition, measurement and reporting including procedures for providing gNB knowledge about feasible DL and UL beams for the UE 100.

As described previously, a parameter of the received DL reference signals may be determined. In an example embodiment, the parameter may be indicative of a time delay, dT, between reception of a first DL reference signal and at least a second DL reference signal from first and at least a second network node, e.g. TRP1, TRP2 of the plurality of network nodes respectively.

The measurements can also be performed on additional DL reference signals (i.e. a third, fourth DL reference signals etc.) from further network nodes, if appropriate.

FIG. 3 shows an example of how the time delay, dT, may be calculated. In FIG. 3, a spread of multipath components 304, or taps, of the DL signals may be received from each of the first and second nodes, e.g. TRP1, TRP2. The time delay, dT, may be calculated as the difference in receiving time between the earliest multipath component 305 of the PDP for a first DL reference signal and the earliest multipath component 306 of the PDP for the second DL reference signal. Consideration of only the earliest multipath component of the PDPs power delay profile may be appropriate because remaining multipath components are likely caused by reflections of the signals which cause the PDP spread.

In some example embodiments, the parameter may be determined according to the following equation:

$$\text{Parameter} = dT + \frac{DS}{2} \quad (1)$$

In equation (1), the variable DS may be indicative of a delay spread of the most recent received DL reference signal of the DL reference signals. As indicated above, and with reference to FIG. 3, the delay spread may be the difference between the time of arrival, or receipt, of the earliest multipath component 306 (typically a line-of-sight component) and the time of arrival of the last multipath component 307.

With regard to the second operation 202 described with reference to FIG. 2, the determination that the parameter does not meet a predetermined criteria (which could be a singular criterion or multiple criteria) may be established in advance of the DL reference signals being received at the UE 100.

For example, default criteria may be used or an operator of the UE 100 may set the predetermined criteria. The predetermined criteria may be updated if necessary depending on changing requirements or conditions.

The predetermined criteria may be used as a measure of whether a one TA loop or multi-TA loops is or are suitable for a particular mTRP scenario. Measurements may be carried out to determine the parameter and these are compared to the predetermined criteria to ascertain whether one TA loop or multi-TA loops are the preferred option transmission of candidate UL signals from the UE 100 to the at least one of the plurality of network nodes, e.g. TRP1, TRP2.

The predetermined criteria may involve testing the parameter against a threshold value. For example, if the parameter given in equation (1) is above the threshold value, then the parameter may be determined to meet the predetermined criteria. If the parameter is at or below the threshold value, then the parameter may be determined not to meet the predetermined criteria. In an alternative implementation, the reverse case may be used.

In some example embodiments, an implementation range may fall within 0%-5% of the threshold value.

Determining an example threshold value will now be described.

In order for the UE 100 to successfully use one TA for UL mTRP transmissions, the different signals paths should fulfill the following criteria: each network node (or gNB) should receive a significant part of the signal within a cyclic prefix (CP) length, accounting for an alignment margin typically at one-third of the CP length. The alignment margin may enable the UE 100 to track a changing DL reference time in both negative and positive directions. The remaining two-thirds of the CP length allows for a relative time difference between the signals as well as the delay spread DS. Therefore, the time difference, dT, between the signals and the delay spread, DS, of the most recent received signal need to fit within two-thirds CP length.

By way of example, in the case of 1 TA and 2 reference timing (i.e. each TRP has its own reference time tracked by the UE 100), the threshold value may be determined according to the following equation (2):

$$\tfrac{1}{3} CP \quad (2)$$

where CP is indicative of a cyclic prefix of the received DL reference signals. The threshold value may be approximately equal to ⅓ CP.

By way of further example, in the case of 1 TA and 1 reference timing (i.e. the UE 100 only keeps track of the reference timing of one of the TRPs), the threshold value may be determined according to the following equation (3):

$$\tfrac{2}{3}CP \quad (3)$$

CP is specified for 5G NR, i.e. FR2 as 120 kHz CP=586 ns (see TS38.211). Therefore, according to some example embodiments, the CP may be exactly 586 ns. Alternatively, the CP may be approximately equal to 586 ns. The CP may be within the range 550 ns to 620 ns. For example, the CP may be within the range of 570 ns to 600 ns. For example, the CP may be within the range 580 ns to 590 ns.

1 TA and 2 Reference Timings

In the case of 1 TA and 2 reference timings, in order for the UE 100 to successfully use one TA loop for UL mTRP transmission, the parameter meeting the predetermined criteria may be determined according to the following equation (4):

$$T + \frac{DS}{2} \leq \frac{1}{3}CP \quad (4)$$

The parameter not meeting the predetermined criteria may therefore be determined according to the following equation (5):

$$dT + \frac{DS}{2} > \frac{1}{3}CP \quad (5)$$

1 TA and 1 Reference Timing

In the case of 1 TA and 1 Reference timing, in order for the UE 100 to successfully use one TA loop for UL mTRP transmission, the parameter meeting the predetermined criteria may be determined according to the following equation (6):

$$dT + DS \leq \tfrac{2}{3}CP \quad (6)$$

The parameter not meeting the predetermined criteria may therefore be determined according to the following equation (7):

$$dT + DS > \tfrac{2}{3}CP \quad (7)$$

The above equations are provided by way of example only. Different threshold values and parameters may be conceivably used depending on the construction of the apparatus and particularly taking account of the number of TAs and Refs provided in the system.

If it is determined that the parameter does meet the predetermined criteria, transmission of candidate UL signals, from the UE 100 to the at least one of the plurality of network nodes can be grouped into one TA loop.

The UE 100 may indicate that transmission of the candidate UL signals can be grouped into one timing advance loop in a transmitted message to at least one of the plurality of network nodes and, possibly, to all of the network nodes.

If it is determined that the parameter does not meet its predetermined criteria, then the UE 100 may reconfigure its antenna system such that at least one of the DL reference signals is received using a narrow beam configuration (as shown, for example, in FIG. 4). The antenna system may be autonomously reconfigured such that the number of active antenna elements of the array and/or the phase shift difference between the elements is changed.

In this case, the UE 100 may switch from the first mode, in which the antenna system is configured to receive signals using a wide beam configuration, to a second mode in which the antenna system is configured to receive signals using a narrow beam configuration. Where the antenna system is an antenna array, the switch from the first mode to the second mode may be achieved by reconfiguring the antenna array. The antenna array may be reconfigured into the second mode by activating all elements of the array with phase shifters, or by other means.

The reconfiguration of the antenna elements attempts to shorten the delay spread of the most recently-received DL reference signal, such that the calculated parameter may meet the predetermined criteria mentioned above.

As shown in FIG. 5, it is also possible to receive all respective DL reference signals as narrow beam DL reference signals. When the UE 100 uses a narrow beam for DL reference signals from TRP2, as shown in FIG. 4, the gain may increase which can create a power imbalance between the streams to the different TRPs, i.e. TRP1 and TRP2 in the shown example. This may require a gain increase towards the first TRP in order to keep the power balanced. To compensate for this, the UE 100 may use a narrow beam for receiving and transmitting with the TRP with the shortest delay, as illustrated in FIG. 5. Therefore, using a narrow beam on both or all the TRPs provides improved power balance.

In the case that the antenna system of the UE 100 has been reconfigured into the second mode such that such that at least one of the DL reference signals is received using a narrow beam configuration, the measurements on the DL reference signals may be re-performed. If the predetermined criteria is or are met, then it is determined that transmission of candidate UL signals, from the UE 100 to the at least one of the plurality of network nodes for which the DL reference signals met the predetermined criteria, can be grouped into one TA loop. If the predetermined criteria is or are not met, then a plurality of TA loops will be required and appropriate signalling to the network nodes can take place.

Figure 6:
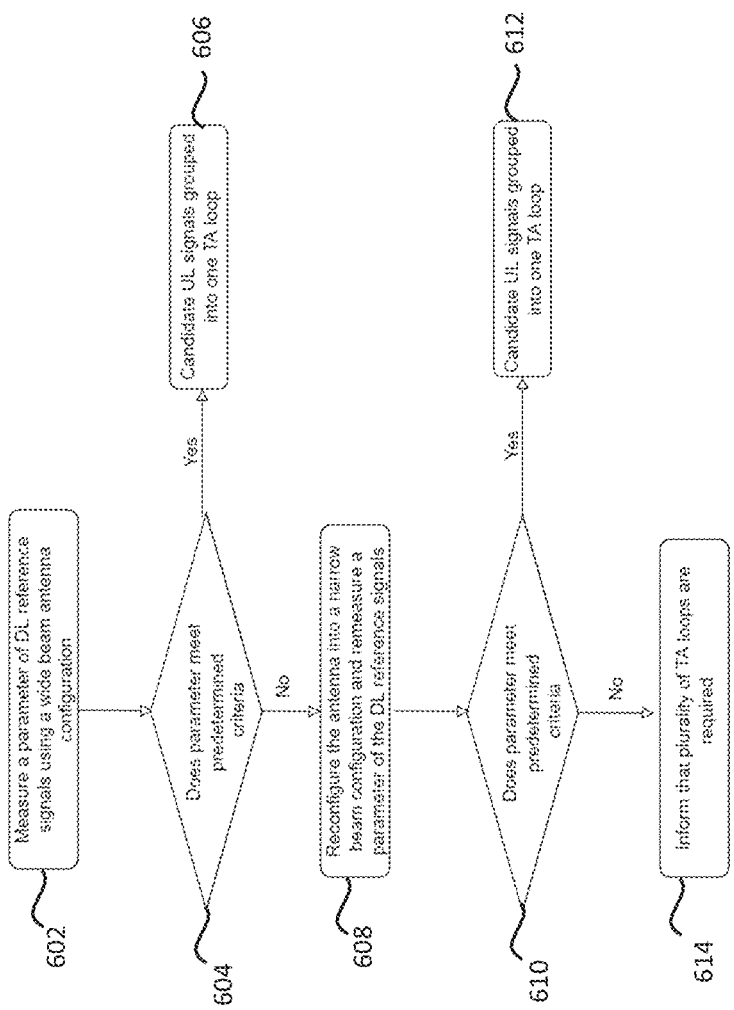
FIG. 6 shows, by way of example, a flow chart of a decision making process.

FIG. 6 is a further flowchart of a method according to example embodiments. Each element of the flowchart may comprise one or more operations. The operations may be performed in hardware, software, firmware or a combination thereof. For example, the operations may be performed, individually or collectively, by a means, wherein the means may comprise at least one processor; and at least one memory storing instructions that, when executed by the at least one processor, cause the performance of the operations. The operations may, for example, be performed at a UE such as UE 100 shown in FIG. 1.

A first operation 602 may comprise measuring a parameter of DL reference signals from network nodes using a wide beam antenna configuration. A second operation 604 may comprise determining if the parameter meets a predetermined criterion or criteria. If so, then in a third operation 606, candidate UL signals may be grouped into one TA loop. If not, then in a fourth operation 608, the antenna or antenna system of the UE 100 may be reconfigured into a narrow beam configuration and the parameter remeasured for the DL reference signals from the network nodes. In a fifth operation 610, it is determined if the remeasured parameter now meets the predetermined criteria or criterion, effectively repeating the second operation 604. If so, then in a sixth operation 612, it is determined that the candidate UL signals may be grouped into one TA loop. If not, then in a seventh operation 614, the network nodes may be informed that a plurality of TA loops are required. The method 200 may comprise a first operation 201 of receiving, at a UE from a plurality of network nodes, respective DL reference signals.

Example embodiments enable an apparatus, e.g. a UE 100, to group TRPs into a single TA-loop which previously would not have fulfilled the criteria during neighbour cell measurements, thereby expanding mTRP configurations that the UE can support. For example, if the UE 100 were only to support one TA loop, it would restricts the possible TRPs that can be configured for UL signals, hence not fully benefiting from reliability and throughput enhancements brought by the relevant feature in Rel-17 (for TDM operation) and Rel-18 (for simultaneous UL Transmission). Example embodiments may be particularly beneficial in multipath scenarios where there is a long delay spread, such as when TRPs are located further away from the UE 100. In general, it is preferably to have as few TA loops as is necessary as there may be additional overhead. Furthermore, some UE hardware may only support single TA loop configurations and therefore example embodiments enable grouping of TAs for UEs that would not otherwise be suitable for supporting multiple TA loops. Furthermore, the use of multiple TA loops imposes additional scheduling restrictions on the network side to avoid overlapping transmissions for UL mTRP TDM patterns. Indeed, in the case that a UE only supports single transmissions at a time to two TRPs (across multiple panels), then two TAs will not allow the UE to transmit two consecutive UL symbols to two different TRPs, due to potential overlap. Therefore, to avoid this overlap, the network needs to schedule a gap, which is resource consuming and can limit achievable throughput. However, using one TA loop can enable symbol to symbol switching between the TRPs, and hence more efficient scheduling is possible.

In example embodiments, the UE 100 may further receive an activation signal for activation of a TA loop in response to transmitting the indication that the transmission of the candidate UL signals can be grouped into one TA loop.

Figure 7:
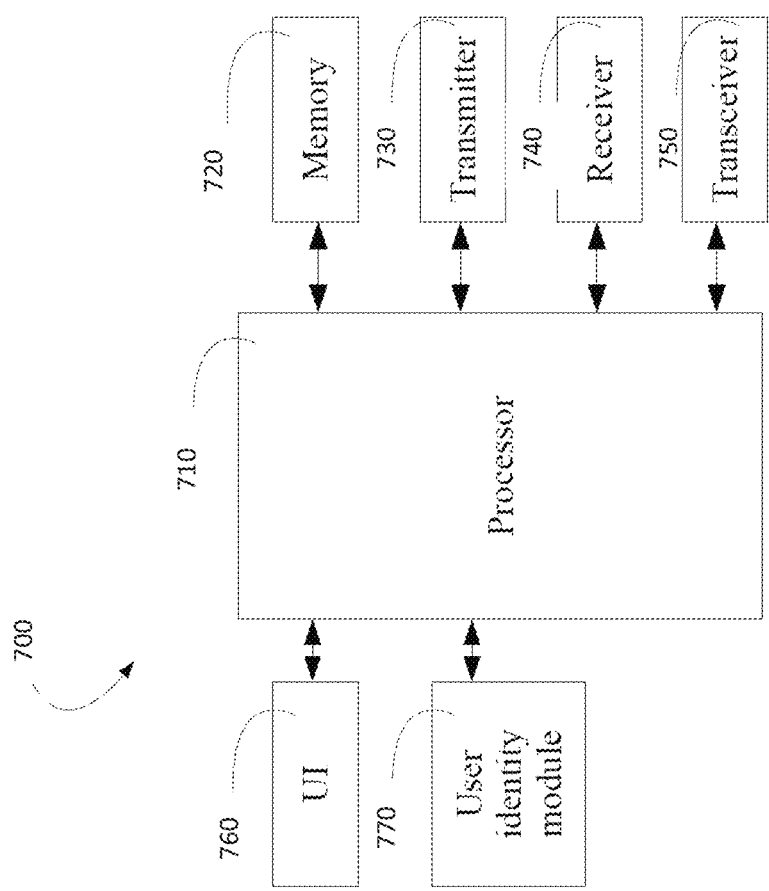
FIG. 7 shows, by way of example, a block diagram of an apparatus.

In example embodiments, the UE 100 may determine, based on the parameter not meeting the predetermined criteria, that a plurality of TA loops are required for transmission of the candidate UL signals to the plurality of network nodes. This may happens based on the parameter still not meeting the predetermined criteria, after the antenna has been configured into the second mode (narrow beam configuration). In other words, the parameter is found not to meet the parameter using either the wide or narrow beam configurations. It follows that a plurality of TA loops are required for transmission of the candidate UL signals from the UE to the plurality of network nodes. The UE may transmit, to the network nodes, an indication that at least one additional TA loop is needed for transmission of candidate UL beams. This may be reported DL RS measurements in two or more groups. When a network node receives the measurements results in two or more groups, the network node detects the need for an additional TA loop. Grouping may be performed by the UE using a receiver spatial filter Example Apparatus FIG. 7 shows, by way of example, a block diagram of an apparatus capable of performing the method(s) as disclosed herein. Illustrated is device 700, which may comprise, for example, a mobile communication device such as mobile 100 of FIG. 1. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core designed by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
at least one processor; and
at least one memory storing instructions that, when executed by the at least one processor, causes the apparatus to:
receive, at a user equipment from a plurality of network nodes, respective downlink reference signals, wherein an antenna system of the user equipment receives the downlink reference signals using a wide beam configuration;
perform measurements on the received downlink reference signals to determine a parameter and determining that the parameter does not meet a predetermined criteria;
reconfigure, based on the parameter not meeting the predetermined criteria, the antenna system such that at least one of the downlink reference signals is received using a narrow beam configuration;
re-perform the measurements on downlink reference signals from the plurality of network nodes to determine the parameter and determining that the parameter does meet the predetermined criteria; and
determine, based on the parameter meeting the predetermined criteria, that transmission of candidate uplink signals, from the user equipment to at least one of the plurality of network nodes, can be grouped into one timing advance loop.

2. The apparatus of claim 1, wherein the at least one processor and the at least one memory storing instructions that, when executed by the at least one processor, further cause the apparatus to:
transmit, to at least one of the plurality of network nodes, an indication that the transmission of the candidate uplink signals can be grouped into one timing advance loop.

3. The apparatus of claim 2, wherein the at least one processor and the at least one memory storing instructions that, when executed by the at least one processor, further cause the apparatus to:
receive an activation signal for activation at the apparatus of the timing advance loop in response to transmitting the indication that the transmission of the candidate uplink signals can be grouped into one timing advance loop.

4. The apparatus of claim 1, wherein the at least one processor and the at least one memory storing instructions that, when executed by the at least one processor, further cause the apparatus to:
determine, based on the parameter not meeting the predetermined criteria, that a plurality of timing advance loops are required for transmission of the candidate uplink signals from the user equipment to the plurality of network nodes.

5. The apparatus of claim 4,
wherein the at least one processor and the at least one memory storing instructions that, when executed by the at least one processor, further cause the apparatus to:
transmit, to the plurality of network nodes, an indication that a plurality of timing advance loops are required for transmission of the candidate uplink signals.

6. The apparatus of claim 5,
wherein the at least one processor and the at least one memory storing instructions that, when executed by the at least one processor, further cause the apparatus to:
receive an activation signal, at the apparatus, for activation of the plurality of timing advance loops, in response to transmitting the indication that a plurality of timing advance loops are required for transmission of the candidate uplink signals from the user equipment.

7. The apparatus of claim 1, wherein the parameter is indicative of a time delay, dT, between reception of a first and at least a second downlink reference signal from a first and at least a second network node of the plurality of network nodes respectively.

8. The apparatus of claim 7, wherein:
the determining that the parameter does not meet the predetermined criteria is by determining that the parameter is above a threshold value; and
the determining that the parameter does meet the predetermined criteria is by determining that the parameter is at or below the threshold value.

9. The apparatus of claim 8, wherein:
the parameter is determined according to:

$dT+DS$; and the threshold value is determined according to:

$\tfrac{2}{3}CP$;

wherein DS is indicative of a delay spread of the last received downlink reference signal of the downlink reference signals and CP is indicative of a cyclic prefix of the received downlink reference signals.

10. The apparatus of claim 1, wherein the reconfiguring the antenna system is such that a plurality of the downlink reference signals are received using a narrow beam configuration.

11. The apparatus of claim 1, wherein the reconfiguring the antenna system is such that all of the downlink reference signals are received using a narrow beam configuration.

12. The apparatus of claim 1, wherein the antenna system comprises an antenna array comprising a plurality of antenna elements.

13. The apparatus of claim 1, wherein the apparatus is a user device.

14. The apparatus of claim 1, wherein the network nodes are radio access network, RAN, base stations.

15. A method comprising:
receiving, at a user equipment from a plurality of network nodes, respective downlink reference signals, wherein an antenna system of the user equipment receives the downlink reference signals using a wide beam configuration;
performing measurements on the received downlink reference signals to determine a parameter and determining that the parameter does not meet a predetermined criteria;
reconfiguring, based on the parameter not meeting the predetermined criteria, the antenna system such that at least one of the downlink reference signals is received using a narrow beam configuration;
re-performing the measurements on downlink reference signals from the plurality of network nodes to determine the parameter and determining that the parameter does meet the predetermined criteria; and
determining, based on the parameter meeting the predetermined criteria, that transmission of candidate uplink signals, from the user equipment to at least one of the plurality of network nodes, can be grouped into one timing advance loop.

16. The method of claim 15, further comprising transmitting, to at least one of the plurality of network nodes, an indication that the transmission of the candidate uplink signals can be grouped into one timing advance loop.

17. The method of claim 16, further comprising receiving an activation signal for activation at the apparatus of the timing advance loop in response to transmitting the indication that the transmission of the candidate uplink signals can be grouped into one timing advance loop.

18. The method of claim 15, further comprising determining, based on the parameter not meeting the predetermined criteria, that a plurality of timing advance loops are required for transmission of the candidate uplink signals from the user equipment to the plurality of network nodes.

19. A non-transitory computer-readable medium comprising program instructions stored thereon for performing at least the following: receiving, at a user equipment from a plurality of network nodes, respective downlink reference signals, wherein an antenna system of the user equipment receives the downlink reference signals using a wide beam configuration; performing measurements on the received downlink reference signals to determine a parameter and determining that the parameter does not meet a predetermined criteria; reconfiguring, based on the parameter not meeting the predetermined criteria, the antenna system such that at least one of the downlink reference signals is received using a narrow beam configuration; re-performing the measurements on downlink reference signals from the plurality of network nodes to determine the parameter and determining that the parameter does meet the predetermined criteria; and determining, based on the parameter meeting the predetermined criteria, that transmission of candidate uplink signals, from the user equipment to at least one of the plurality of network nodes, can be grouped into one timing advance loop.

* * * * *